(12) United States Patent
McMullen et al.

(10) Patent No.: US 8,346,219 B1
(45) Date of Patent: Jan. 1, 2013

(54) METHOD AND SYSTEM FOR DELIVERING CALLING PARTY NOTIFICATIONS

(75) Inventors: Michael P. McMullen, Leawood, KS (US); Hugh H. Fletcher, Overland Park, KS (US); Robert H. Miller, Leawood, KS (US); Robert W. Hammond, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2038 days.

(21) Appl. No.: 10/893,282

(22) Filed: Jul. 16, 2004

(51) Int. Cl.
*H04M 1/725* (2006.01)

(52) U.S. Cl. ............ 455/412.2; 455/412.1; 455/413; 455/414.1; 455/435.1

(58) Field of Classification Search .......... 455/403, 455/414.1, 426.2, 414.4, 432.3, 73, 412.1–412.2, 455/413, 415–417, 435.1–435.3
See application file for complete search history.

(56) References Cited

U.S. PATENT DOCUMENTS

| | | | | |
|---|---|---|---|---|
| 5,311,574 A | * | 5/1994 | Livanos | 379/209.01 |
| 6,044,144 A | * | 3/2000 | Becker et al. | 379/265.02 |
| 6,081,725 A | * | 6/2000 | Ishida | 455/462 |
| 6,154,644 A | * | 11/2000 | Murray | 455/414.1 |
| 6,298,228 B1 | * | 10/2001 | Singh | 455/403 |
| 6,411,805 B1 | * | 6/2002 | Becker et al. | 455/414.1 |
| 6,804,509 B1 | * | 10/2004 | Okon et al. | 455/414.1 |
| 6,925,299 B1 | * | 8/2005 | Sofer et al. | 455/414.2 |
| 2004/0054732 A1 | * | 3/2004 | Carter et al. | 709/206 |
| 2004/0198331 A1 | * | 10/2004 | Coward et al. | 455/414.1 |

* cited by examiner

*Primary Examiner* — Wayne Cai

(57) ABSTRACT

A method and system are provided for delivering calling party notifications. An artificial intelligence software application located on an Intelligence Rules Server is operable to infer why a first call to a mobile station is not connected and predict when a second call to a mobile station is likely to be connected. The application communicates the inference and the prediction to a voice messaging system. The voice messaging system delivers a message to a calling party based on the inference and/or the prediction.

24 Claims, 2 Drawing Sheets

METHOD AND SYSTEM FOR DELIVERING CALLING PARTY NOTIFICATIONS

BACKGROUND

1. Field of the Invention

The present invention relates to mobile communications and, more particularly, to a method and system for delivering calling party notifications.

2. Description of Related Art

When a call is placed to a mobile station and the call is not connected, the calling party may receive a pre-recorded message that the called party is unavailable. Additionally, the calling party may receive a message providing the option of leaving a message in the called party's voice mail box. The calling party may then choose to leave a message or not.

In many circumstances, the calling party may urgently need to contact the called party. In this scenario, the calling party may call other telephone numbers associated with the called party, such as a home telephone number and a work telephone number. The calling party, if still unsuccessful, may call other parties, such as family members and friends, to locate the called party. Much time may pass before the calling party eventually contacts the called party.

The called party may have missed the call for a wide variety of reasons. The mobile station may be de-registered or dropped from the wireless network and be unable to receive calls. The called party may turn off the mobile station upon reaching a particular destination, at a particular time, upon boarding an airplane, or for other reasons. The mobile station may be dropped from the network for a variety of reasons as well, such as bad weather, a poor coverage area, and network problems. Additionally, the mobile station may have rung, but the called party may have opted to not answer the call.

In any event, the calling party does not know why the call was not connected. Additionally, the calling party does not know when the mobile station is likely to become available. If the calling party knew that a second call to the called party would likely be connected in a short amount of time, the calling party may try calling the mobile station again, instead of calling other telephone numbers associated with the called party or calling other parties. If the calling party knew that it would likely be awhile before a call to the mobile station is connected, the calling party may wait to place a second call to the mobile station and/or leave a voice mail message.

SUMMARY

The present invention provides a method and system for delivering calling party notifications to a calling party when a call to a mobile station is not connected. Beneficially, the invention provides additional information and/or options to the calling party when the call is not connected. The calling party notifications may include information such as why the call was not connected and when a call to the mobile station is likely to be connected in the future. Further, the calling party notifications may provide options to the calling party, such as an offer to connect the call when the mobile station becomes available.

An artificial intelligence software application stored in a data storage unit on an Intelligence Rules Server is operable to infer why a first call to a mobile station is not connected and predict when a second call to a mobile station is likely to be connected. The inference and the prediction may depend on a variety of factors. The factors may include device type factors, device availability factors, network factors, location factors, time factors, consumer factors, and/or special factors. Additional factors may also be used to make the inference and the prediction.

The application may obtain data with respect to the factors in the form of parameters. For example, the parameters may include time, location, status, and weather. The application may obtain correlations from a table that includes a listing of parameters associated with the factors and an identification of predetermined correlations between the parameters. The application may make an inference as to why a call to the mobile station is not connected based on the correlation of the parameters. The application may make a prediction as to when the mobile station may become available to receive a call based on the inference and the correlation of parameters.

The application may communicate the inference and/or the prediction to a voice messaging system. The voice messaging system may then deliver a message to a calling party based on the inference of why the first call to the mobile station is not connected and/or the prediction of when the second call to the mobile station is likely to be connected. The voice messaging system may also offer to complete the second call when the mobile station becomes available.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

I. System for Delivering Calling Party Notifications

Figure 1:
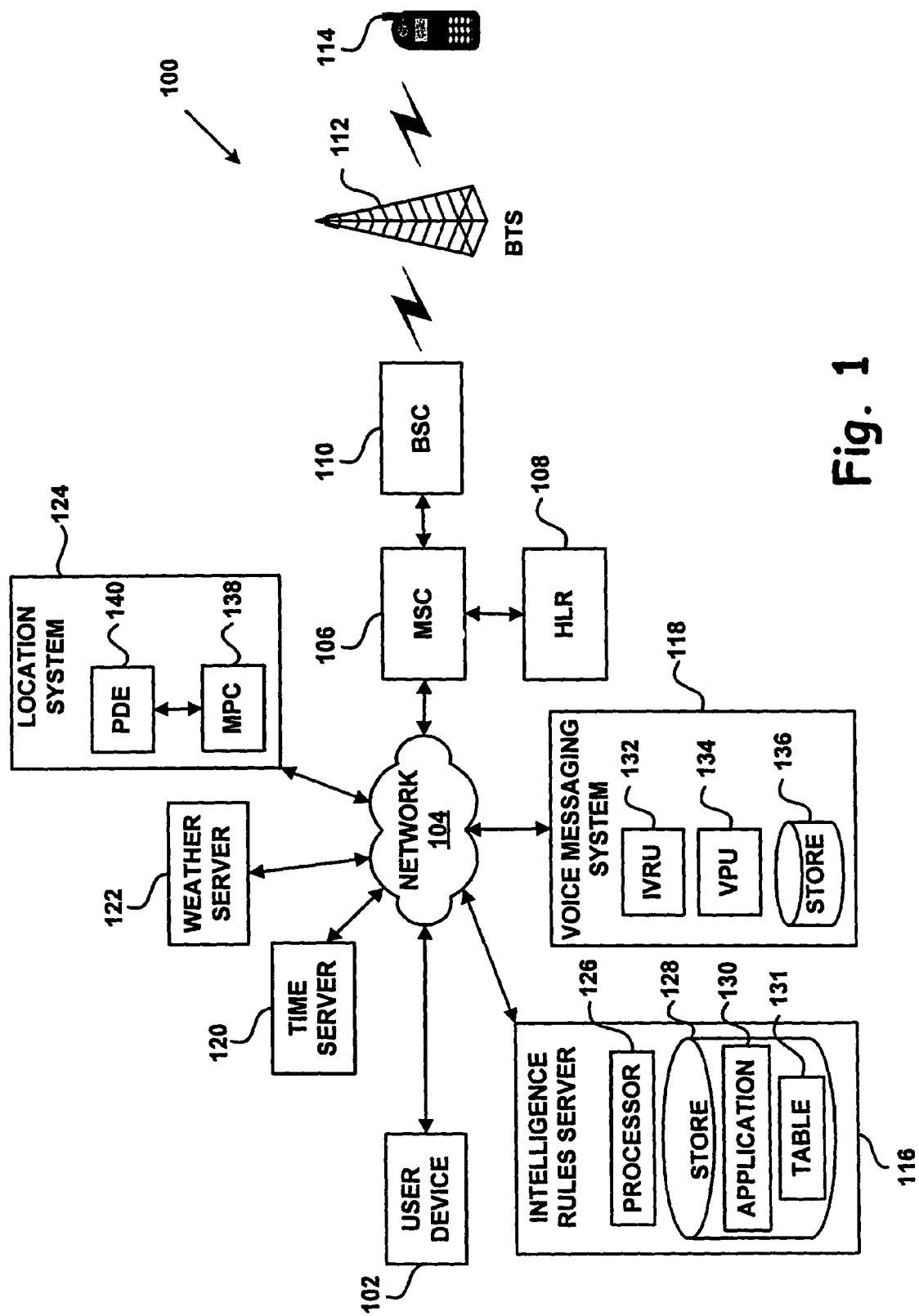
FIG. 1 is a block diagram of a system for delivering calling party notifications, according to an embodiment.

FIG. 1 is a simplified block diagram of a system 100 for delivering calling party notifications. Calling party notifications are messages provided to a calling party when a call initiated by the calling party to a mobile station is not connected. The calling party notifications may provide information to the calling party regarding why the call was not connected and/or when a call to the mobile station is likely to be connected.

The system 100 includes a user device 102, a network 104, a Mobile Switching Center ("MSC") 106, a home location register ("HLR") 108, a base station controller ("BSC") 110, a base transceiver station ("BTS") 112, a mobile station 114, an Intelligence Rules Server 116, and a voice messaging system 118. The system 100 may also include various servers that provide data to the Intelligence Rules Server 116, such as a time server 120 and a weather server 122. The system 100 may also include a location system 124, which may be used to provide more precise location information than the HLR 108. The system 100 may include additional entities not shown in FIG. 1, such as a Visitor Location Register ("VLR").

The user device 102 may be any device that can be used for communications, such as a landline telephone, a cellular telephone, a personal digital assistant, a personal computer, or other telecommunication device. As such, the user device 102 may be operable to place a call to the mobile station 114. The call originated at the user device 102 may be transferred to one or more entities in the network 104.

The network 104 may include one or more networked devices. The network 104 may include entities from a Public Switched Telephone Network ("PSTN") and a packet-switched network, such as the Internet. The network 104 may include devices that are networked via a wired connection and devices that are networked via a wireless connection. The network 104 may be a public or a private network. Other entities not shown in FIG. 1 may also be connected to the network 104 and various entities shown in FIG. 1 may be omitted, integrated together, or distributed.

The MSC 106 is responsible for switching calls. Typically, the MSC 106 also performs the signaling needed to originate and terminate calls to mobile stations, such as the mobile station 114. The MSC 106 may determine the location of the mobile station 114 by requesting the information from the HLR 108 (or a VLR). The HLR 108 is a database of user information that includes information such as account information, account status, user preferences, features subscribed to by the user, as well as the user's current location.

The MSC 106 also communicates with the BSC 110 via a communication link. The communication link may include a Primary Rate Interface ("PRI") employing a plurality of communication and control channels, which may be carried over T1 and/or E1 carrier lines. The BSC 110 manages the power levels and frequencies transmitted by the BTSs under its control, including the BTS 112, and may also control hand-offs between BTSs. The BSC 110 communicates with the BTS 112 over an air interface. The BTS 112 performs radio resource management tasks for its given coverage area. The combination of the BSC 110 and the BTS 112 may function to transmit voice and data traffic between mobile stations. The BTS 112 communicates over the air interface with the mobile station 114.

The mobile station 114 may be any device that can be used for wireless communications, such as a cellular telephone, a personal digital assistant, a personal computer, or other telecommunication device. For example, the mobile station 114 may be a third generation ("3G") or later mobile station capable of simultaneously engaging in voice and data sessions. A 3G mobile station preferably operates in compliance with the 3GPP/3GPP2 industry specifications. (The 3GPP/3GPP2 industry specifications may be found at www.3gpp.org and www.3gpp2.org, respectively.) The mobile station 114 may include a processor programmed with (i) a media codec (such as G.723.1 for encoding and decoding digital voice signals), (ii) a Session Initiation Protocol ("SIP") user agent application to set up packet-data communication sessions, and/or (iii) a real-time transport protocol ("RTP") application to facilitate sending and receiving real-time media packet streams, such as Voice over Internet Protocol ("VoIP") messages.

The voice messaging system 118 may function to store voice messages and provide a mechanism for voice message retrieval. For example, if the user of the user device 102 calls the mobile station 114 and the user of the mobile station 114 does not answer the call, the user of the user device 102 may be transferred to the voice messaging system 118 and given the option to leave a voice message for the user of the mobile station 114. The user of the mobile station 114 may retrieve the message from the voice messaging system 118 at a later time.

The voice messaging system 118 may include an interactive voice response unit 132 ("IVRU"), a voice-processing unit 134, and a memory store 136. The voice messaging system 118 may also include a text-to-speech converter and additional components as well.

The IVRU 132 may be a combination of software, firmware, and hardware that accepts a combination of voice telephone inputs and touch-tone keypad selections, and provides appropriate responses. The IVRU 132 may allow a caller to enter information using a remote touch-tone telephone, and may use a digitized synthesized voice to prompt and answer the caller. The IVRU 132 may also be used to collect information.

The IVRU 132 may provide an interface between speech commands or dual tone multi-frequency ("DTMF") keypad selections provided by a user at the user device 102 and the voice-processing unit 134. The user of the user device 102 may be connected to the IVRU 132 and, by speaking commands or providing keypad selections, browse through navigation points (e.g., applications and/or menu items within the applications) to access and communicate information. The IVRU 132 can thus receive, for instance, spoken commands or keypad selections from the user and use the inputs to guide its execution of voice command applications.

In a preferred embodiment, the IVRU 132 may be a software application. The software application may be written in a variety of computer languages. For example, the IVRU 132 may be programmed in VoiceXML ("VXML"). VXML is a tag-based computer language similar to the HTML language that underlies most Internet web pages. Other languages, such as SpeechML and VpxML, may also be used.

The voice-processing unit 134 may operate to digitize the voice message so the message can be stored in the memory store 136. Accordingly, the voice-processing unit 134 may include an analog-to-digital converter for converting an analog speech signal being received from the user of the user device 102 into a digital bit stream. Alternatively, the user's speech signal might already be digitized, such as in a voice-over-IP communication system, in which case analog-to-digital conversion would be unnecessary. Further, the voice-processing unit 134 may also include a digital-to-analog converter for converting the digital bit stream into an analog speech signal. Accordingly, the voice-processing unit 134 may convert a stored voice message into a speech signal when the voice mailbox owner retrieves the voice message.

In addition to the stored voice messages, the memory store 136 may also include the instructional messages used by the IVRU 132. The memory store 136 may be a single entity, as depicted in FIG. 1, or may consist of more than one entity. For example, the memory store 136 may include a message store that stores the voice messages and an IVRU store containing the instructional messages used by the IVRU 132.

The memory store 136 may be any memory device operable to store data. The memory store 136 may include volatile and/or non-volatile memory devices. For example, the memory store 136 may be located on a memory chip on a printed circuit board. Alternatively, the memory store 136 may be located on a magnetic or optical drive disk.

The time server 120 may provide time information to the Intelligence Rules Server 116. For example, the time server 120 may provide a world time, which is also referred to as the Coordinated Universal Time. In the United States, the National Institute of Standards and Technology and the United States Naval Observatory provide readings of clocks that contribute to world time. Other sources of time may also be used, such as internal corporate network time servers.

The weather server 122 may provide weather information to the Intelligence Rules Server 116. The weather server 122 may obtain weather information from a variety of different sources, such as a news service. The weather server 122 may provide weather information based on location and may update the information on a periodic basis so that current weather information is available to an entity requesting the information.

The location system 124 may function to determine and/or report the locations of mobile stations, such as the mobile station 114. As such, the location system 124 could take a variety of forms. For example, the location system 124 could comprise a mobile position center ("MPC") 138 and a position determining entity ("PDE") 140 as defined by J-STD-036-A, which is hereby incorporated by reference. Alternatively, the location system 124 may take other forms, including location systems that are developed in the future.

The MPC 138 may serve as an interface to the network 104 for the location system 124. As such, the MPC 138 may serve as the entity which retrieves, forwards, stores, and controls position data within the location system 124. When the MPC 138 receives a request for the location of the mobile station 114, the MPC 138 may select a PDE, such as PDE 140, to determine the position of the mobile station 114.

In the embodiment in which the MPC 138 is defined by J-STD-036-A, the MPC 138 may request the position of the mobile station 114 by sending a GetPositionDirective INVOKE ("GPOSREQ") message to the PDE 140. The GPOSREQ message may include details regarding the mobile station 114, such as a mobile identification number, so that the PDE 140 can determine the position of the mobile station 114. Upon receipt of the GPOSREQ message, the PDE 140 may determine the current position of the mobile station 114. Other messaging schemes may be employed.

For example, the PDE 140 may receive position information from the mobile station 114. The mobile station 114 may use a terrestrial positioning system, a celestial positioning system, or a combination of these systems to determine its position. Terrestrial positioning systems may utilize various techniques, such as forward link trilaterization ("FLT"); advanced forward link trilaterization ("AFLT"); amplitude difference, angle of arrival ("AD-AOA"); and enhanced observed time difference ("EOTD"). GPS is an example of a celestial positioning system. The PDE 140 may then process the position information, which may include analyzing pseudoranges obtained from the mobile station 114.

In the embodiment in which the PDE 140 is defined by J-STD-036-A, the PDE 140 may then transmit a GeoPositionRequest RETURN RESULT ("gposreq") message containing the position information corresponding to the location of the mobile station 114 to the MPC 138. When the MPC 138 receives the gposreq message from the PDE 140, the MPC 138 may forward the position information to the Intelligence Rules Server 116. Other messaging schemes may be employed.

The Intelligence Rules Server 116 may be any combination of hardware, firmware, and/or software that is operable to infer why a call to the mobile station 114 is not connected and predict when a call to the mobile station 114 is likely to be connected. For example, the Intelligence Rules Server 116 may include a processor 126 and a data storage unit 128. The processor 126 may be a general purpose processor and/or an application specific processor.

The data storage unit 128 may include volatile and/or non-volatile memory devices. For example, the data storage unit 128 may be located on a memory chip on a printed circuit board. Alternatively, the data storage unit 128 may be located on a magnetic or optical drive disk. An application 130 and a table 131 may be stored in the data storage unit 128.

The application 130 may be stored in the data storage unit 128 in machine language format, which is executable by the processor 126. The application 130 may obtain data from the table 131. While FIG. 1 depicts a single data storage unit 128 including both the application 130 and the table 131, it is understood that more than one data storage unit 128 may be used.

The application 130 may be an artificial intelligence software application operable to infer why a call to the mobile station 114 is not connected and predict when a later call to the mobile station 114 is likely to be connected. The inference and the prediction may depend on a variety of factors. The factors may include device type factors, device availability factors, network factors, location factors, time factors, consumer factors, and/or special factors. Additional factors may also be used to make the inference and the prediction.

When a call is not connected and the call has been redirected to the voice messaging system 118, the voice messaging system 118 may check a flag in the memory store 136 to determine if the called party subscribes to a calling party notification plan. If the called party is a subscriber, then the voice messaging system 118 may send a message to the Intelligence Rules Server 116. The message may inform the Intelligence Rules Server 116 that a call to the called party was not connected. Upon receipt of this message, the Intelligence Rules Server 116 may activate the application 130.

Alternatively, the voice messaging system 118 may automatically send a message to the Intelligence Rules Server 116 indicating that a call was not connected. In this scenario, the Intelligence Rules Server 116 may check a flag in the data storage unit 128 to determine if the called party subscribes to a calling party notification plan. Upon verification that the called party subscribes to a calling party notification plan, the Intelligence Rules Server 116 may activate the application 130.

The table 131 may include a listing of parameters associated with the factors and an identification of predetermined correlations between the parameters. The table 131 may be used by the application 130 to obtain correlations based on parameters retrieved by the application 130 after a call fails. Additionally, the table 131 may include reliability values assigned to the parameters and threshold values assigned to the correlations. The factors, associated parameters, correlations, reliability values, and threshold values are further described in Sections II-III.

II. Factors

As described above, the application 130 makes an inference why a call to the mobile station 114 is not connected and a prediction of when a later call to the mobile station 114 is likely to be connected based on a variety of factors. The application 130 may obtain parameters associated with the factors from a variety of entities connected to the network 104. The application 130 may request this data if the Intelligence Rules Server 116 determines that the data may be useful for making the inference and/or the prediction. The request for data may be performed in sequential batches. For example, the application 130 may request a first batch of data from one or more entities and, based on the data obtained in the first batch, may request additional data. This process may be repeated until the application 130 has enough data to make an inference and/or a prediction, or determine that the inference and/or the prediction cannot be made.

The communication between the application 130 and these entities may be performed using communication protocols now known or developed in the future. For example, Internet protocols may be used to communicate to entities connected to the Internet. The application 130 may send a request message to an entity to obtain data. The entity may then send a response message to the application 130 providing the application 130 with the requested information.

A. Device Type

The device type factors may include the type of the mobile station 114. For example, the application 130 may determine if the mobile station 114 is a telephone, a wireless wide area network interface card, or a telemetry device. While wireless wide area network interface cards and telemetry devices are not "called" in a traditional sense, they may be accessed to obtain information. Further, the application 130 may determine a model of the mobile station 114. The application 130 may also obtain other information with respect to the device type factors.

The application 130 may determine the device type and model of the mobile station 114 by checking a Mobile Positioning Capability ("MPCAP") table. The MPCAP table includes the capability of the mobile station 114 (e.g., AFLT, GPS). Additional details regarding the device type may be added to the MPCAP table. The MPCAP table may be stored on the HLR 108 or any other entity connected to the network 104 that stores device type information.

When a call is not connected and the Intelligence Rules Server 116 determines that device type data may be useful for making the inference and/or the prediction, the application 130 may request the device type data from the MPCAP table. The device type data may provide useful information when the call is dropped but the mobile station 114 is registered. For example, the application 130 may use the device type in making the inference and/or the prediction because some device types may have a higher percentage of dropped calls than other device types.

B. Device Availability

The device availability factors may include the availability of the mobile station 114. For example, the application 130 may determine whether the mobile station 114 is registered on a network. If the mobile station 114 is registered on the network, the application 130 may determine if the mobile station 114 is in a data session. If the mobile station 114 is not registered on the network, the application 130 may determine whether the mobile station 114 de-registered from the network or dropped off the network. The application 130 may also obtain other information with respect to the device availability factors.

When a call is not connected and the Intelligence Rules Server 116 determines that device availability data may be useful for making the inference and/or the prediction, the application 130 may obtain information regarding the device availability factors from the BTS 112. The BTS 112 may know whether or not the mobile station 114 rings after a call is placed to the mobile station 114. The BTS 112 may be designed to record if a call is received by the mobile station 114 but not answered and if a call is not received by the mobile station 114. The device availability information may be stored in memory located on the BTS 112 or another entity connected to the network 104.

C. Network

The network factors may include the conditions of the network at the time the call to the mobile station 114 was initiated. For example, the application 130 may determine whether the mobile station 114 is in a bad coverage area, which may be indicated by the mobile station's broadcast power level (i.e., broadcast setting of the mobile station). The application 130 may also determine the network load at the time of the call to the mobile station 114. The application 130 may also obtain other information with respect to the network factors.

The quality of the coverage area at the time of the call to the mobile station 114 may be obtained from the BTS 112. The BTS 112 may know the broadcast power level of the mobile station 114. The broadcast power level may be indicative of the quality of the coverage area. For example, the mobile station 114 may, be at a maximum broadcast power level when the mobile station 114 is in a bad coverage area. The BTS 112 may be designed to record the broadcast power level of the mobile station 114. The broadcast power level information may be stored in memory located on the BTS 112 or another entity connected to the network 104.

Additionally, the conditions of the network may be monitored by a service provider for the mobile station 114 or another entity connected to the network 104. The service provider may have coverage maps that identify the quality of the wireless network in different areas. These maps may identify bad coverage areas, areas that have high incidents of dropped calls, areas currently experiencing outages, and so on. The coverage maps may be updated on a periodic basis so as to contain relatively current network data. The service provider may also have real time network condition maps that include substantially real time performance and coverage data (i.e., real time Geographic Information System "GIS" data mapped to geography) of the wireless network.

When a call is not connected and the Intelligence Rules Server 116 determines that network data may be useful for making the inference and/or the prediction, the application 130 may request the broadcast power level data from the BTS 112 and/or the map data from the service provider or other entity monitoring and storing network quality data.

D. Location

The location factors may include the location of the mobile station 114 in the network. For example, the application 130 may determine whether the mobile station 114 is moving. Further, the application 130 may determine whether the mobile station 114 has left an area of coverage. Additional location factors may include a type of location in which the mobile station 114 is located (e.g., urban, suburban, or rural area) and the location of the mobile station 114 when it was dropped or de-registered. The application 130 may also obtain other information with respect to the location factors.

When a call is not connected and the Intelligence Rules Server 116 determines that location data may be useful for making the inference and/or the prediction, the application 130 may request and obtain the position of the mobile station 114 from the location system 124. The location information obtained from the location system 124 may then be compared to the coverage map. The coverage map may include the types of locations, such as urban, suburban, and rural.

Alternatively, the application 130 may request the location information from the HLR 108 (or a VLR) or a presence monitor connected to the network 104. The presence monitor may be a server designed to track cell/sector handoffs. The time between handoffs and the size of a cell/sector cluster may be used to determine the type of locations. For example, a cell/sector cluster in a rural area may be large in comparison to a cell/sector cluster in an urban area. A long time between handoffs may indicate that the mobile station 114 is in a rural area.

E. Time

The time factors may include the time and day that the call to the mobile station 114 was placed and the time and day that the mobile station 114 was last removed from the network (e.g., dropped or de-registered). The application 130 may obtain the time information from the HLR 108 and/or the time server 120. The application 130 may also obtain other information with respect to the time factors. The time factors may provide useful information because the wireless network may be more congested at certain times and/or on certain days. When the wireless network is more congested a call is more likely to be dropped than when the wireless network is less congested.

F. Consumer

The consumer factors may include consumer patterns, profiles, and permissions. For example, the application 130 may determine whether the user of the mobile station 114 is typically located in a certain place at a certain time (e.g., home at night, work during the day). Further the application 130 may determine whether the user typically turns on and/or off the mobile station 114 at a particular time. The application 130 may also determine if the user of the mobile station 114 has entered a user profile and/or granted certain permissions. The application 130 may also obtain other information with respect to the consumer factors.

When a call is not connected and the Intelligence Rules Server 116 determines that consumer data may be useful for making the inference and/or the prediction, the application 130 may obtain information regarding the consumer factors from a database that stores consumer information. The consumer database may include data provided by the user of the mobile station 114. For example, the user of the mobile station 114 may complete an on-line form provided by his service provider (or other entity) that includes fields for addresses of locations the user visits frequently (e.g., home, work, relatives, friends), common routines (e.g., work from 8 am-6 pm Monday to Friday, Sunday lunch at Mom's house), and authorized individuals to receive calling party notifications. The consumer database may be located in memory on the HLR 108 or another entity connected to the network 104.

Additionally and/or alternatively, the consumer may use a Personal Information Manager ("PIM"), which typically includes an electronic calendar and an address book. The user of the mobile station 114 may enter consumer information into the PIM that may be used to infer why a first call is not connected to the mobile station 114 and/or to predict when a second call to the mobile station 114 is likely to be connected. The PIM may be stored in the mobile station 114 and/or in an entity connected to the network 104.

Additionally and/or alternatively, consumer information may be obtained by tracking past activities of the consumer. For example, the user of the mobile station 114 may typically travel from a first location to a second location in the morning and return to the first location in the evening during the work week. The past activity information may be stored in the consumer database and/or in another database within an entity connected to the network 104. The past activity information may be used to infer why a first call is not connected to the mobile station 114 and/or to predict when a second call to the mobile station 114 is likely to be connected.

G. Special

The special factors may include activity at airports, weather, and any other factors that may impact why a call to the mobile device 114 is not connected and when a call to the mobile station 114 is likely to be connected. For example, the application 130 may determine whether the mobile station 114 was dropped or de-registered from the network when the mobile station 114 was located at an airport. The application 130 may determine that the mobile station 114 was at an airport by obtaining location information from the location system 124, the HLR 108, the presence monitor, or other entity connected to the network 104.

Further, the application 130 may obtain weather information for the location of the mobile station 114 at the time of the call. The application 130 may obtain the weather information for the location of the mobile station 114 from the weather server 122. The weather information may be useful for inferring why a call was dropped. A call is more likely to be dropped during storms than when the weather is relatively calm. Additionally, the weather information may be useful for predicting when a call to the mobile station 114 is likely to be connected (i.e., after the storm passes the location of the mobile station 114).

Another special factor may be network maintenance. The network maintenance may be scheduled or unscheduled maintenance of the wireless network. During the network maintenance a call is more likely to be dropped. If a call is dropped when the wireless network is undergoing maintenance, the application may infer that the cause of the dropped call is the maintenance activities. Additionally, the application may predict that a call to the mobile station 114 is likely to be connected after the maintenance is completed. The application 130 may also obtain other information with respect to the special factors.

III. Making Inferences/Predictions

The application 130 may obtain data with respect to the aforementioned factors in the form of parameters. For example, the parameters may include time, location, status, and weather. Correlations between different parameters may be predetermined. The parameters and the predetermined correlations may be contained in the table 131. For example, the parameters of a de-registered mobile station and a location at an airport may be correlated to a user of the mobile station boarding a flight.

The application 130 may make an inference as to why a call to the mobile station 114 is not connected. The inference may be made when a call to the mobile station 114 fails. The inference may be based on a comparison of the parameters obtained by the application 130 regarding the mobile station 114 with the correlations identified in the table 131. For example, the call may not have been connected to the mobile station 114 because the mobile station 114 is de-registered or dropped from the network, the network is experiencing a high load or has a history of providing poor coverage, a severe storm is occurring in the vicinity of the mobile station 114, and so on.

After making the inference, the application 130 may make a prediction as to when the mobile station 114 may become available to receive a call. The prediction may be based on the inference of why a call was not connected, the parameters obtained by the application 130, and any correlations identified in the table 131. For example, a call may be connected to the mobile station 114 after the mobile station 114 registers with the network, the mobile station 114 moves to an area of the network providing a better coverage, the severe storm moves away from the vicinity of the mobile station 114, and so on.

The reliability of the prediction may depend on the number of correlations that can be made with the parameters and the quality of those correlations. By increasing the number of parameters used in making the prediction, the reliability of the prediction may improve. Reliability values may be assigned to the parameters for determining the reliability of the prediction. Some of the parameters may be assigned a simple Boolean value (e.g., the mobile station 114 is registered on the network or it is not). A parameter assigned a Boolean value may have a first value for a positive response (e.g., yes, true) and a second value for a negative response (e.g., no, false). Other parameters may be assigned a relative or scaled value (e.g., a scale from 1 to 10, where 10 is a high reliability parameter).

The reliability values assigned to the parameters may be stored in the table 131. The values assigned to the parameters may be combined by the application 130 to determine the reliability of the prediction. For example, the values may be multiplied together. The higher the value of the combination, the more reliable the prediction may be.

For example, a scale that factors in the percent of dropped calls for a given cell/sector may provide an indication of why a call is not connected. The more dropped calls (indicating worse coverage) the higher the likelihood a mobile station is in a bad coverage area. This parameter coupled with another linear ranking, such as likelihood of a vehicle containing the mobile station 114 stopping, may yield fairly high percentage prediction. If the cell/sector is in an area where one main road connects two small suburban cities but has no shopping, businesses, or housing, the probability of the vehicle stopping is very low, increasing the chances that the user of the mobile station 114 will continue to drive and be handed off to a cell/sector with improved coverage. As the number of dropped calls decreases and the number of places to stop increases, the quality of a prediction that a handset will be available for a call soon decreases.

A threshold value may identify whether the prediction is reliable enough for use in providing a calling party with calling party notifications. The threshold value may be predetermined and stored in the table 131. The threshold value may be set for a specific value and then adjusted over time based on the appropriateness of the threshold value according to past experience.

The threshold value may limit the use of predictions to those having a certain level of reliability. When the reliability of a prediction is below the threshold value, the calling party may not receive additional information or may be informed that no additional information is available. Additionally, the calling party may be informed of the projected reliability of the prediction (e.g., "There is an 87% chance the called party will be available to receive a call in 3 minutes").

If the call fails, the application 130 may communicate the inference and/or the prediction to the voice messaging system 118. For example, the application 130 may generate and send a text message to the voice messaging system 118 to be provided to the calling party. Alternatively, the application 130 may provide the inference and/or the prediction to the voice messaging system 118 and the voice messaging system 118 may generate a text message for the calling party notifications.

Upon receipt of the message and/or predictions from the application 130, the voice messaging system 118 may provide an introductory message that offers information and options other than leaving a voice message to the calling party. The voice messaging system 118 may provide either the text message received from the application 130 or generate a calling party notification using the inference and/or the prediction. The calling party notification may indicate a reason why the call was not connected and/or a time in which the call is likely to be connected. Further, the calling party notification may inform the calling party of the reliability of the application's prediction.

The voice messaging system 118 may also offer to complete the call when the called party becomes available. If the mobile station 114 is de-registered, the BTS 112 may know when the mobile station 114 registers. The Intelligence Rules Server 116 may send a message to the BTS 112 requesting notification of when the mobile station 114 registers. When the BTS 112 notifies the Intelligence Rules Server 116 that the mobile station 114 has registered with the BTS 112, the Intelligence Rules Server 116 may send a message to the voice messaging system 118 notifying the voice messaging system 118 that the mobile station 114 is registered. The voice messaging system 118 may then complete the call between the calling party and the mobile station 114.

If the mobile station 114 has been dropped off the network, the Intelligence Rules Server 116 may send a "ping" message periodically to the mobile station 114. When the mobile station 114 receives the ping message, the mobile station 114 may send a message to the Intelligence Rules Server 116 that it has received the ping message. The Intelligence Rules Server 116 may send a message to the voice messaging system 118 notifying the voice messaging system 118 that the mobile station 114 is connected. The voice messaging system 118 may then complete the call between the calling party and the mobile station 114. Alternatively, the mobile station 114 may be programmed with a software application that is designed to send a message to the BTS 112 or other entity indicating that the mobile station 114 has been connected after being dropped from the network.

The voice messaging system 118 may complete the call by calling both the mobile station 114 and the calling party. The first party to answer may be placed on hold until the second party answers. When both parties answer, the voice messaging system 118 may connect the call between the two parties (i.e., the mobile station 114 and the calling party).

The called party may authorize calling parties to receive the calling party notifications. The authorized parties may be identified in the consumer database, which may be stored in memory on the HLR 108 or another entity connected to the network 104. The called party may authorize specific individuals or groups to obtain the calling party notifications. For example, the called party may be a sales representative that uses a company-owned mobile station 114. The company may provide global permission to receive calling party notifications to other company employees and/or the sales representative's customers. Further, the called party may limit the permission to certain information and/or options. The called party may also limit the permission based on time of day.

IV. Method for Delivering Calling Party Notifications

Figure 2:
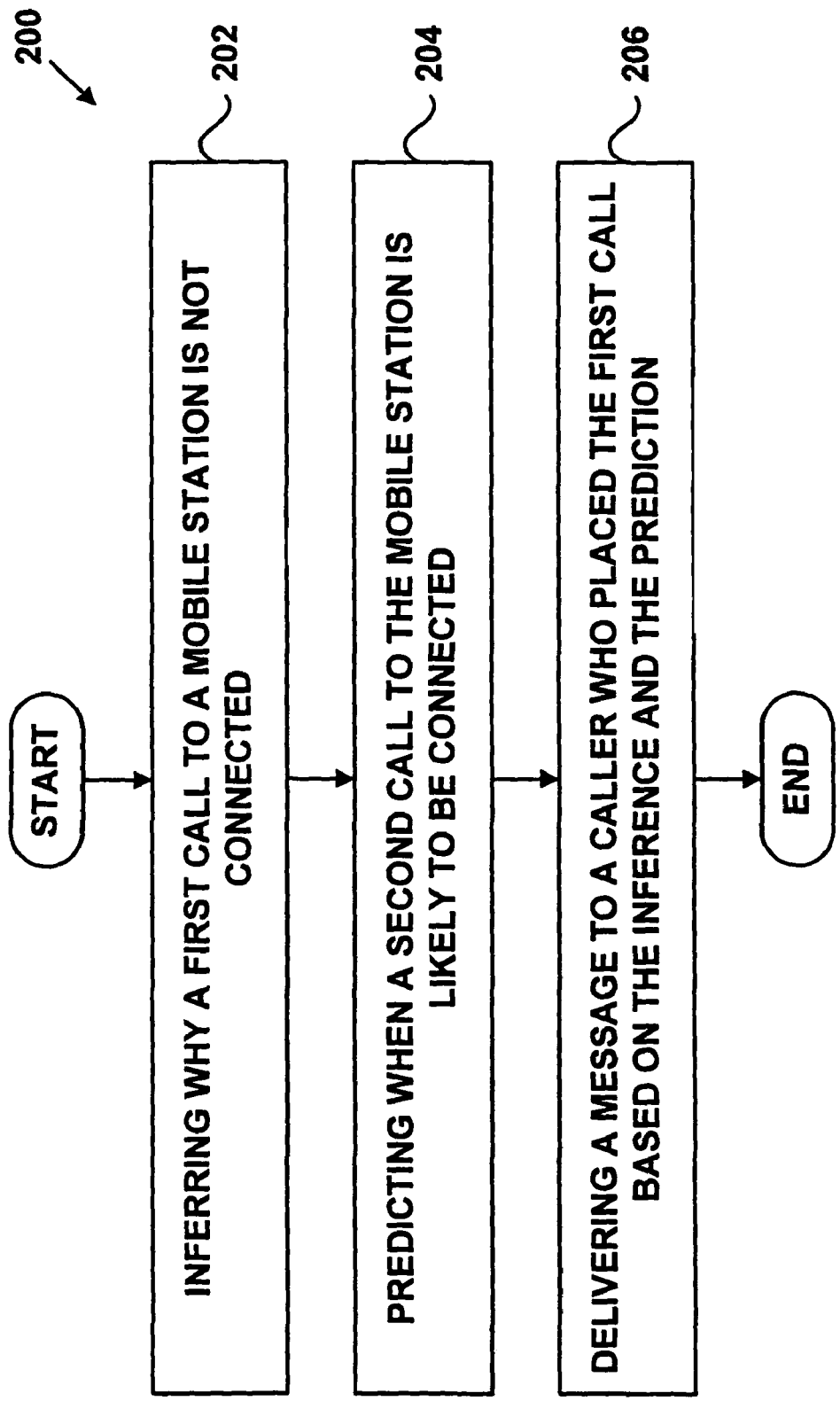
FIG. 2 is a flow diagram of a method for delivering calling party notifications, according to an embodiment.

FIG. 2 is a flow chart of a method 200 for delivering calling party notifications. At block 202, an inference is made as to why a first call to the mobile station 114 is not connected. The application 130 analyzes parameters obtained via the network 104 to make the inference as to why a call was not connected to the mobile station 114. Reasons for a call not being connected may include the mobile station 114 being de-registered or dropped from the network, a network problem (e.g., heavy load, low coverage), weather related problems, or a called party choosing not to answer the call.

At block 204, a prediction is made as to when a second call to the mobile station 114 is likely to be connected. The application 130 uses the inference and the parameters obtained via the network 104 to make the prediction as to when a second call to the mobile station 114 is likely to be connected. The prediction may be based on the data provided by the user in the consumer database, the location of the mobile station 114, and the condition of the network.

The more data used to make the prediction, the more reliable the prediction may be. If the application 130 determines that the prediction meets or exceeds a threshold value of reliability, the prediction may be communicated to the voice messaging system 118. If the application 130 determines that the prediction does not meet the threshold value of reliability, the application 130 may inform the voice messaging system 118 that there is no information available regarding when a second call to the mobile station 114 is likely to be connected.

At block 206, a message or calling party notification is delivered to the calling party that initiated the first call. The message is based on the inference made at block 202 and the prediction made at block 204. The message may include a reason why the call was not connected (e.g., "The party you have called is currently in an area that does not have cellular coverage," "The party you have called is currently traveling by airplane and is unable to receive calls during the flight," etc.). The message may also include information indicating when a call placed to the mobile station 114 is likely to be connected (e.g., "The party you have called is likely to be available in five minutes," "The party you have called is likely to be available tomorrow morning after 9 am," etc.). The message may also include an indication of how reliable the prediction is, which may be either a qualitative (e.g., "very likely") or quantitative (e.g., 75% likely) indication. The message may have some or all of the information described. Further, if the prediction does not meet the threshold value of reliability, the message may indicate that no information regarding the unconnected call is available. Alternatively, no calling party notifications may be provided to the calling party.

V. Examples

The following examples are provided to further explain, but not limit, the system 100 and method 200 for delivering calling party notifications.

In a first example, a car traveling a major thoroughfare enters a cell/sector that has a high percentage of dropped and uncompleted calls. It is a very typical pattern along this road for a mobile station 114 to temporarily lose coverage for a few minutes until the next cell/sector is entered. If a call is attempted when the mobile station 114 is in this poor coverage area, the wireless network may not be able to connect the call and may redirect the calling party to the voice messaging system 118. The voice messaging system 118 may inform the calling party that the called party is expected to be available soon and the calling party may consider retrying the call in approximately two minutes. Additionally, the voice messaging system 118 may offer to complete the call when the called person reenters coverage shortly.

In a second example, a person calls the mobile station 114 at 10 pm. The application 130 determines that the mobile station 114 is stationary, located in the cell/sector in which the called party lives, and was turned off at 9 pm. Further the application 130 determines that the called party typically turns on the mobile station 114 at approximately 7 am after the mobile station 114 has been turned off in the evening. The application 130 predicts that the called party will be available in approximately nine hours. The application 130 may send a prediction to the voice messaging system 118 that a call to the mobile station 114 is likely be connected in nine hours. The voice messaging system 118 may then inform the calling party that the called party is currently unavailable, but would likely be available in approximately nine hours.

In a third example, a person calls the mobile station 114 when the called party is located in an airplane. The application 130 determines that the mobile station 114 was turned off at the airport. Depending on which airport the called party was at when the mobile station 114 was de-registered, it may be possible to determine the longest flight that departs from that airport. For example, if the called party was at a small commuter airport, the longest flight departing from that airport may be four hours. The application 130 may obtain this information via the network 104 and send a prediction to the voice messaging system 118 that the called party has boarded an airplane and is likely to be unavailable up to approximately four hours. The voice messaging system 118 may then inform the calling party that the called party has likely boarded an airplane and is likely to be unavailable up to approximately four hours.

In a fourth example, a person calls the mobile station 114 and the mobile station 114 rings, but the called party does not answer the call. The application 130 may determine whether the mobile station 114 is stationary or moving. If the mobile station 114 is stationary, the called party may be in a meeting or otherwise occupied. If the mobile station 114 is moving, the called party may be driving and may not answer the call for safety reasons. The application 130 predicts that the called party chose not to answer the call and provides this prediction to the voice messaging system 118. The voice messaging system 118 may then inform the calling party that the called party chose not to answer the call and whether or not the mobile station is moving. The calling party may then determine when to place a second call.

As these examples show, calling party notifications may provide useful information to a calling party. The calling party may then decide when to try calling the mobile station 114 again. Additionally, the voice messaging system 118 may connect the call when the mobile station 114 becomes available. Calling party notifications may be especially useful in emergency situations, when contacting a key employee, family member, or other person is critical.

An exemplary embodiment of the present invention has been described above. Those skilled in the art will understand, however, that changes and modifications may be made to this embodiment without departing from the true scope and spirit of the present invention, which is defined by the claims. For example, a voice messaging system was described as providing the calling party notifications to the calling party. However, other service nodes or network entities may provide calling party notifications to the calling party. Further, the calling party notifications may be sent to the calling party as a text message, a multimedia message, or other type of message, and is not limited to a voice message.

We claim:

1. A method for delivering calling party notifications, comprising in combination:
    inferring why a first call to a mobile station is not connected;
    predicting when in the future the mobile station will likely be available to receive a second call that has not yet been initiated to the mobile station; and
    delivering a message based on the inference of why the first call to the mobile station is not connected and the prediction of when in the future the mobile station will likely be available to receive the second call.

2. The method of claim 1, wherein inferring why the first call to the mobile station is not connected and predicting when the mobile station is likely to be available to receive the second call comprises analyzing factors selected from the group consisting of device type, device availability, network, location, time, consumer, and special factors.

3. The method of claim 2, wherein analyzing factors comprises monitoring parameters associated with the factors and identifying correlations between the parameters.

4. The method of claim 3, wherein inferring why the first call to the mobile station is not connected and predicting when in the future the mobile station will likely be available to receive the second call comprises basing the inference and the prediction on the monitored parameters and the identified correlations.

5. The method of claim 1, wherein the message provides information regarding why the first call to the mobile station was not connected.

6. The method of claim 1, wherein the message provides information regarding when in the future the mobile station will likely be available to receive the second call.

7. The method of claim 1, wherein the message provides information regarding the reliability of the prediction.

8. The method of claim 1, wherein the message provides at least one option.

9. The method of claim 8, wherein the at least one option includes connecting the second call when the mobile station is available to receive the second call.

10. The method of claim 1, further comprising determining reliability of the prediction, wherein delivering the message is performed when the reliability of the prediction exceeds a threshold value.

11. The method of claim 10, wherein determining the reliability of the prediction comprises assigning values to parameters used to make the prediction.

12. The method of claim 1, further comprising verifying whether a calling party is authorized to receive the message before delivering the message.

13. A system for delivering calling party notifications, comprising in combination:
   a processor;
   data storage; and
   machine language instructions stored in the data storage executable by the processor, in response to an unconnected first call to a mobile station, to:
      infer why the first call to the mobile station is not connected;
      predict when in the future the mobile station will likely be available to receive a second call that has not yet been initiated to the mobile station; and
      deliver a message based on the inference of why the first call to the mobile station is not connected and the prediction of when in the future the mobile station will likely be available to receive the second call.

14. The system of claim 13, wherein the system infers why the first call to the mobile station is not connected and predicts when in the future the mobile station will likely be available to receive the second call by analyzing factors selected from the group consisting of device type, device availability, network, location, time, consumer, and special factors.

15. The system of claim 14, wherein the system analyzes factors by monitoring parameters associated with the factors and identifying correlations between the parameters.

16. The system of claim 15, wherein the system infers why the first call to the mobile station is not connected and predicts when in the future the mobile station will likely be available to receive the second call based on the monitored parameters and the identified correlations.

17. The system of claim 13, wherein the message provides information regarding why the first call to the mobile station was not connected.

18. The system of claim 13, wherein the message provides information regarding when in the future the mobile station will likely be available to receive the second call.

19. The system of claim 13, wherein the message provides information regarding the reliability of the prediction.

20. The system of claim 13, wherein the message provides at least one option.

21. The system of claim 20, wherein the at least one option includes connecting the second call when the mobile station is available to receive the second call.

22. The system of claim 13, further comprising machine language instructions to determine reliability of the prediction, wherein delivering the message is performed when the reliability of the prediction exceeds a threshold value.

23. The system of claim 22, wherein the system determines the reliability of the prediction by assigning values to parameters used to make the prediction.

24. The system of claim 13, further comprising machine language instructions to verify whether a calling party is authorized to receive the message before delivering the message.

* * * * *